(12) United States Patent
Yang et al.

(10) Patent No.: US 11,994,677 B2
(45) Date of Patent: May 28, 2024

(54) WEARABLE ELECTRONIC DEVICE

(71) Applicant: SAMSUNG ELECTRONICS CO., LTD., Suwon-si (KR)

(72) Inventors: Hyunmo Yang, Suwon-si (KR); Junwhon Uhm, Suwon-si (KR); Yongseob Yun, Suwon-si (KR); Junmyeong Jeong, Suwon-si (KR); Myeongjae Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 17/675,581

(22) Filed: Feb. 18, 2022

(65) Prior Publication Data

US 2022/0260832 A1    Aug. 18, 2022

Related U.S. Application Data

(63) Continuation of application No. PCT/KR2022/002386, filed on Feb. 17, 2022.

(30) Foreign Application Priority Data

Feb. 18, 2021    (KR) .................. 10-2021-0021973

(51) Int. Cl.
*G02B 27/01* (2006.01)
*G06T 19/00* (2011.01)

(52) U.S. Cl.
CPC ..... *G02B 27/0101* (2013.01); *G02B 27/0172* (2013.01); *G02B 27/0176* (2013.01);
(Continued)

(58) Field of Classification Search
None
See application file for complete search history.

(56) References Cited

U.S. PATENT DOCUMENTS

2012/0068913 A1    3/2012  Bar-Zeev et al.
2015/0185765 A1    7/2015  Peek et al.
(Continued)

FOREIGN PATENT DOCUMENTS

KR    10-2015-0057122 A    5/2015
KR    10-2016-0076535 A    6/2016

OTHER PUBLICATIONS

Written Opinion (PCT/ISA/237) dated May 30, 2022 issued by the International Searching Authority in International Application No. PCT/KR2022/002386.
(Continued)

*Primary Examiner* — Stephen T. Reed
(74) *Attorney, Agent, or Firm* — Sughrue Mion, PLLC

(57) ABSTRACT

A wearable device is provided. The wearable device includes a first display member corresponding to a first eye of a user, a second display member corresponding to a second eye of the user, where the first display member and the second display member are configured to provide visual information to the user, a lens frame configured to surround at least a part of the first display member and at least a part of the second display member, a first wearing member provided on a first portion of the lens frame, a second wearing member provided on a second portion of the lens frame, a first circuit board provided in the first wearing member, a first processor provided on the first circuit board and configured to operate the first display member, and a second circuit board provided in the second wearing member.

18 Claims, 8 Drawing Sheets

(52) U.S. Cl.
CPC .... *G06T 19/006* (2013.01); *G02B 2027/0132* (2013.01); *G02B 2027/0138* (2013.01); *G02B 2027/014* (2013.01); *G02B 2027/0178* (2013.01)

(56) References Cited

U.S. PATENT DOCUMENTS

| | | |
|---|---|---|
| 2017/0108697 A1 | 4/2017 | El-Ghoroury et al. |
| 2018/0144554 A1 | 5/2018 | Watola et al. |
| 2019/0212566 A1* | 7/2019 | Lee .................. G02C 11/10 |
| 2019/0331920 A1 | 10/2019 | Watola et al. |
| 2020/0319455 A1 | 10/2020 | Cummings et al. |
| 2021/0255482 A1* | 8/2021 | Ryner ................. G02C 5/2227 |

OTHER PUBLICATIONS

International Search Report (PCT/ISA/210) dated May 30, 2022 issued by the International Searching Authority in International Application No. PCT/KR2022/002386.

\* cited by examiner

WEARABLE ELECTRONIC DEVICE

CROSS-REFERENCE TO RELATED APPLICATION(S)

This application is a continuation of International Application No. PCT/KR2022/002386, filed on Feb. 17, 2022, in the Korean Intellectual Property Receiving Office, which is based on and claims priority to Korean Patent Application No. 10-2021-0021973, filed on Feb. 18, 2021, in the Korean Intellectual Property Office, the disclosures of which are incorporated by reference herein in their entireties.

BACKGROUND

1. Field

The disclosure relates generally to an electronic device, and in particular, to a wearable electronic device which is wearable on a part of a human body.

2. Description of Related Art

A portable electronic device (e.g., an electronic scheduler, a portable multimedia reproducer, a mobile communication terminal, or a tablet personal computer (PC)) is generally equipped with a display and a battery, and has a bar-type, folder-type, or sliding-type appearance due to the shape of the display member or the battery. Recently, as displays and batteries improve in performance, wearable electronic devices, which are miniaturized to be capable of being worn on a part of a human body, such as a wrist or a head, have been commercialized. Since the wearable electronic devices are directly worn on a human body, the wearable electronic devices can be improved in portability and/or user accessibility.

Among the wearable electronic devices, an electronic device that can be worn on a user's face may include, for example, a head-mounted device (HMD). The head mounted device may be used to implement virtual reality (VR) or augmented reality (AR). For example, a wearable electronic device may provide a three-dimensional image of a virtual space in a game enjoyed through a television or a computer monitor, but may implement VR by blocking the image of the real space in which the user is present. Another type of wearable electronic device may implement AR that provides various pieces of visual information to a user by implementing a virtual image while providing an environment in which the user can visually recognize an actual image of a space in which the user is present.

As a wearable electronic device mountable on a head, a wearable electronic device (e.g., virtual reality (VR) glasses or augmented reality (AR) glasses) may include display members are mounted in the shape of a glasses frame, and a virtual object is capable of being processed through the display members.

The AR glasses may provide various pieces of information about a space in which a user is present or an object disposed in the space, depending on the user's gaze direction.

For example, AR glasses may acquire various pieces of information about the space or the object from various camera modules and/or sensor modules disposed on the front surfaces of the AR glasses, and may output a screen in which an AR object is added to an image.

Various electronic components including the camera modules and/or the sensor modules may be disposed inside the AR glasses to output an image and an AR object added to the image. These electronic components may be disposed on a circuit board or a frame structure disposed inside the housing of the AR glasses.

A connector may be provided to transmit signals between the plurality of electronic components disposed inside the housing of the AR glasses. However, when many connectors for electrically connecting the plurality of electronic components are provided, the volume of the wearable electronic device may increase and may not accord with recent trends of weight reduction and miniaturization of wearable electronic devices. For example, in the AR glasses, there may be more than 200 signal lines for signal connection between a plurality of electronic components inside the housing. The existence of a large number of signal lines may limit the design of AR glasses, and when a large number of signal lines are concentrated on only one of both eye parts of the AR glasses, an issue exists in that a calorific value increases.

SUMMARY

Provided is a connection structure that simplifies signal connection between a plurality of electronic components disposed inside an AR glasses housing.

Provided is a dual operating system in which each system corresponds to both eye parts of the AR glasses by using the plurality of electronic components.

In accordance with an aspect of the disclosure, a wearable electronic device may include a first display member corresponding to a first eye of a user, a second display member corresponding to a second eye of the user, where the first display member and the second display member are configured to provide visual information to the user, a lens frame configured to surround at least a part of the first display member and at least a part of the second display member, a first wearing member provided on a first portion of the lens frame, a second wearing member provided on a second portion of the lens frame, a first circuit board provided in the first wearing member, and a first processor provided on the first circuit board and configured to operate the first display member, a second circuit board provided in the second wearing member, and a second processor provided on the second circuit board and configured to operate the second display member. The first processor and the second processor may be configured to operate independently such that the first processor is configured to output lights for the first display member and the second processor is configured to output lights for the second display member.

The first processor and the second processor may be configured to synchronize a first screen displayed on the first display member and a second screen displayed on the second display member.

The first screen displayed on the first display member and the second screen displayed on the second display member may be configured to be synchronized by connecting the first circuit board and the second circuit board with a first connector.

The lens frame may include a connection member between the first display member and the second display member, and the first connector may be configured to penetrate the connection member.

The first hinge member may be provided between the first wearing member and the lens frame, and a second hinge member may be provided between the second wearing member and the lens frame. A second connector may be configured to penetrate the first hinge member, and a third connector may be configured to penetrate the second hinge member.

The first circuit board and the second circuit board may be configured to be connected to an external electronic device or a server by a short-range communication module.

The wearable electronic device may further include a plurality of camera modules.

The plurality of camera modules may include a first camera module and a second camera module provided on a portion of the first display member, and a third camera module and a fourth camera module provided on a portion of to the second display member.

The first camera module and the third camera module may be configured to be connected to the first circuit board and may be configured to be controlled by the first processor. The second camera module and the fourth camera module may be configured to be connected to the second circuit board and may be configured to be controlled by the second processor.

The first processor may be configured to transmit or receive camera-related information processed by the first processor and camera-related information processed by the second processor. The second processor may be configured to transmit or receive camera-related information processed by the first processor and camera-related information processed by the second processor.

The first processor may be configured to adjust an output of the first display member based on a battery residual capacity of the wearable electronic device based on the first display member being operated, or the second processor may be configured to adjust an output of the second display member based on the battery residual capacity of the wearable electronic device based on the second display member being operated.

In accordance with an aspect of the disclosure, a wearable device including a dual system may include a first display member corresponding to a first eye of a user, a second display member corresponding to a second eye of the user, where the first display member and the second display member are configured to provide visual information to the user, a lens frame configured to surround at least a part of the first display member and at least a part of the second display member, and configured to define an internal space of the wearable electronic device, a first wearing member provided on a first portion of the lens frame, a second wearing member provided on a second portion of the lens frame, a first operating system comprising a first processor and configured to control the first display member, a second operating system comprising a second processor and configured to control the second display member, and a connector provided between the first operating system and the second operating system and configured for display synchronization and data transmission of the first operating system and the second operating system.

A screen displayed on the first display member and a screen displayed on the second display member may be configured to be displayed in synchronization.

The connector may include a board-to-board (BTB) connector.

The lens frame may include a connection member between the first display member and the second display member, and the connector may be configured to penetrate the connection member.

A first hinge member may be provided between the first wearing member and the lens frame, and a second hinge member may be provided between the second wearing member and the lens frame. A second connector may be configured to penetrate the first hinge member, and a third connector may be configured to penetrate the second hinge member.

The first operating system and the second operating system may be configured to be connected to an external electronic device or a server by a short-range communication module.

The wearable electronic device may include a plurality of camera modules.

The plurality of camera modules may include a first camera module and a second camera module provided on a portion of the first display member, and a third camera module and a fourth camera module provided on a portion of to the second display member.

The first camera module and the third camera module may be configured to be connected to the first operating system and may be configured to be controlled by the first operating system. The second camera module and the fourth camera module may be configured to be connected to the second operating system and may be configured to be controlled by the second operating system.

Provided is an arrangement structure of internal components (e.g., parts) of a wearable electronic device to accord with the trend of weight reduction and miniaturization of electronic devices by preventing the concentration of centers of gravities and reducing the number of signal lines among electronic components.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
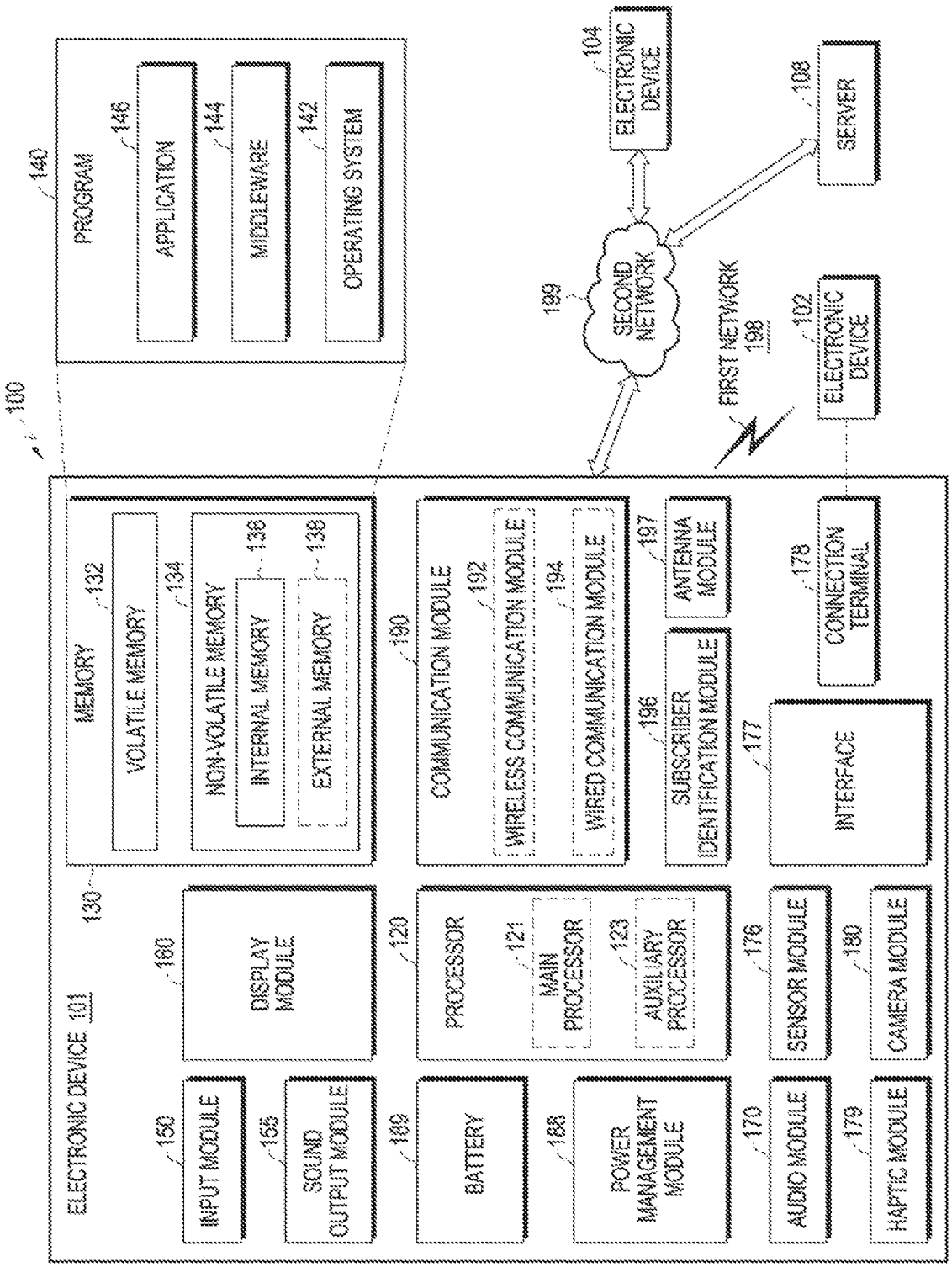
FIG. 1 is a block diagram of an electronic device according to various embodiments of the disclosure in a network environment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device and the external electronic device via the server coupled with the second network. Each of the external electronic devices may be a device of a same type as, or a different type, from the electronic device. According to an embodiment, all or some of operations to be executed at the electronic device may be executed at one or more of the external electronic devices. For example, if the electronic device should perform a function or a service automatically, or in response to a request from a user or another device, the electronic device, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device. The electronic device may provide the outcome, with or without further processing of the outcome, as at least part of a reply to the request. To that end, a cloud computing, distributed computing, mobile edge computing (MEC), or client-server computing technology may be used, for example. The electronic device may provide ultra low-latency services using, e.g., distributed computing or mobile edge computing. In another embodiment, the external electronic device may include an internet-of-things (IoT) device. The server may be an intelligent server using machine learning and/or a neural network. According to an embodiment, the external electronic device or the server may be included in the second network. The electronic device may be applied to intelligent services (e.g., smart home, smart city, smart car, or healthcare) based on 5G communication technology or IoT-related technology.

Figure 2:
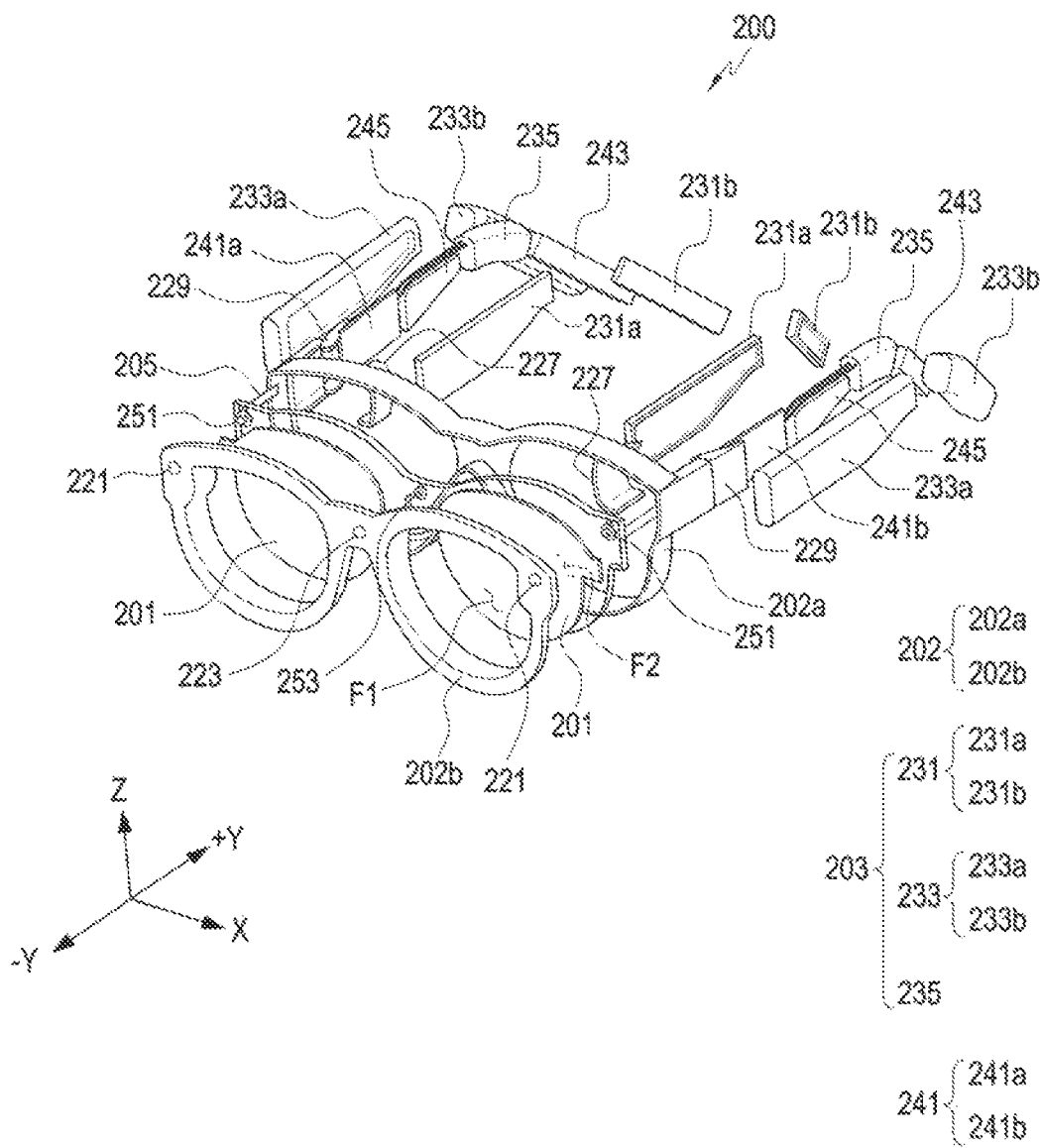
FIG. 2 is a perspective view illustrating a wearable electronic device according to various embodiments of the disclosure in a disassembled state.
Figure 3:
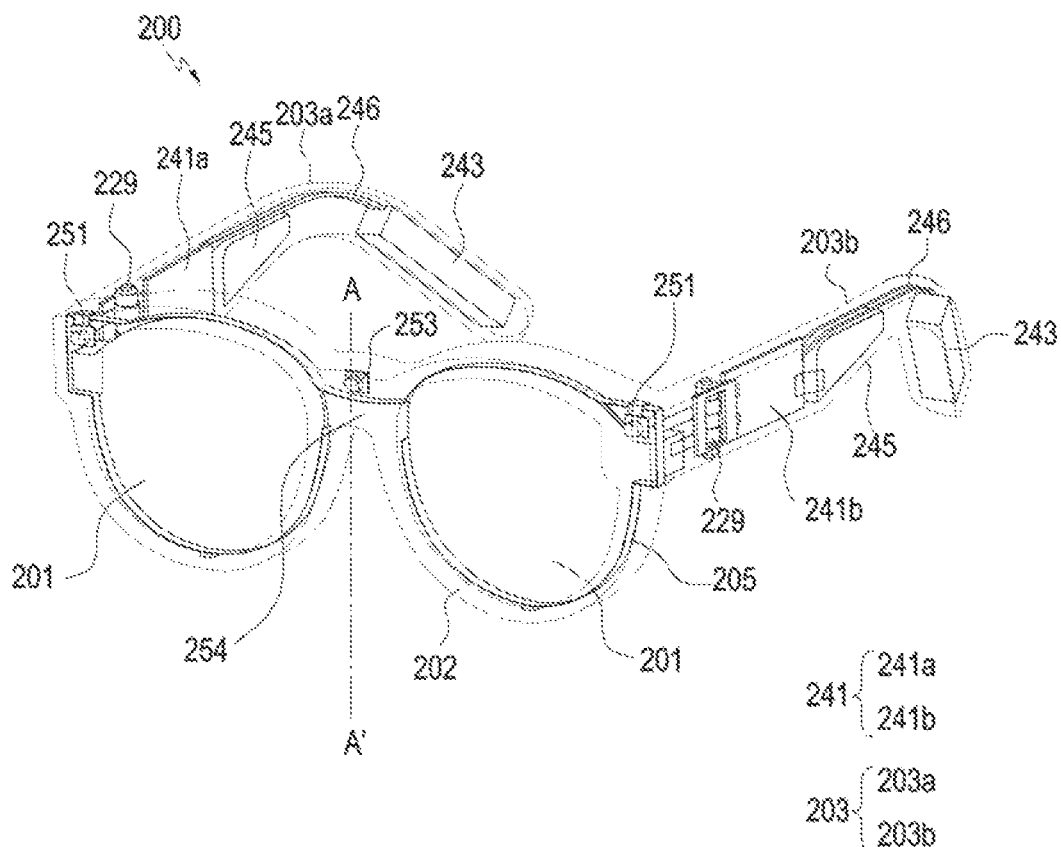
FIG. 3 is a perspective view illustrating the wearable electronic device according to various embodiments of the disclosure in an assembled state.

FIG. 2 is a perspective view illustrating a wearable electronic device 200 (e.g., the electronic device 101 in FIG. 1) according to various embodiments of the disclosure in a disassembled state. FIG. 3 is a perspective view illustrating the wearable electronic device 200 (e.g., the electronic device 101 in FIG. 1) according to various embodiments of the disclosure in an assembled state. Through the illustration of FIG. 3, an arrangement between electronic components inside and adjacent to display members and wearing members according to various embodiments is illustrated.

Referring to FIGS. 2 and 3, the wearable electronic device 200 is a glasses-type electronic device. A user can visually recognize a surrounding object or environment even in a state of wearing the wearable electronic device 200. The electronic device 200 may acquire and/or recognize visual images regarding an object or environment in a direction in which the user gazes or the electronic device 200 is oriented (e.g., the −Y direction) using the camera module 251 (e.g., the camera module 180 in FIG. 1) and may receive information about an object or environment from an external electronic device (e.g., the electronic devices 102 and 104 or the server 108 in FIG. 1) via a network (e.g., the first network 198 or the second network 199 in FIG. 1). In another embodiment, the electronic device 200 may provide the received information about the object or environment to the user in an acoustic or visual form. For example, the wearable electronic device 200 may provide the received information about the object or environment to the user via the display members 201 in a visual form using a display module (e.g., the display module 160 in FIG. 1). By implementing information about an object or environment in a visual form (hereinafter, referred to as, for example, an "augmented reality (AR) object") and combining the AR object with a real image (or video) of the user's surrounding environment, the wearable electronic device 200 can implement AR. The display member 201 may provide the user with information about object around the user or the environment by outputting a screen in which the AR object is added to an actual image (or video) of the user's surrounding environment.

In the following detailed description, various references may be made to "a state or location in which the electronic device or a predetermined component of the electronic device faces the user's face". It is noted that this may be based on a state in which the user wears the wearable electronic device 200.

According to various embodiments, the wearable electronic device 200 may include at least one display member 201, a lens frame 202, and a wearing member 203. There is provided a pair of display members 201 including a first display member 201a and a second display member 201b, which may be arranged to correspond to the user's right eye and left eye, respectively, in the state in which the wearable electronic device 200 is worn on the user's body. According to an embodiment, the first display member 201a and the second display member 201b may be disposed to be spaced apart from each other by a predetermined distance with a connection member 254 (e.g., a bridge) interposed therebetween. The connection member 254 may be configured to adjust the separation distance between the display members 201a and 201b in consideration of the shape of the user's head. In some embodiments, the wearable electronic device 200 may have a shape including one display member 201 corresponding to the right eye and the left eye (e.g., a goggles shape).

According to various embodiments, the display member 201 is a configuration provided in order to provide visual information to the user, and may include, for example, a module in which a lens, a display, and/or a touch circuit are mounted. Each of the lens and the display may be formed to be transparent or translucent. As another example, the display member 201 may include a window member, which may be a glass made of a translucent material or a member having light transmittance that is adjustable as the coloring density thereof is adjusted. As another example, the display member 201 may include a lens including a waveguide, a reflective lens, or the like. Since an image output from a light output device (e.g., a projector) is formed on each lens, it is possible to provide visual information to the user. For example, the display member 201 may mean a display that includes a waveguide (e.g., a light waveguide) in at least a portion of each of the lenses and is capable of transmitting an image (or light) output from the light output device to the user's eyes through the waveguide included therein and at the same time transmitting an image of the real world to the user's eyes through the area in a see-through manner.

According to various embodiments, the waveguide may include glass, plastic, or polymer, and at least a (inner or outer) portion of the waveguide may include a grating structure. For example, the grating structure may be formed in a polygonal or curved shape, and may include a nanopattern. For example, the traveling direction of the light transmitted from the light output device and/or the user may be changed by the nanopattern.

According to various embodiments of the disclosure, the display member 201 may include a first surface F1 oriented in a direction in which external light is incident (e.g., in the −Y direction) and a second surface F2 facing away from the first surface F1 (e.g., in the +Y direction). In the state in which the user wears the electronic device 200, the second surface F2 of the display member 201 is disposed to face the left and/or right eyes of the user, and may allow the light or an image incident through the first surface F1 to at least partially pass therethrough to enter the user's left eye and/or right eye. According to various embodiments, the lens frame 202 is a structure that at least partially surrounds the edge of the display member 201 to fix at least a portion of the display member 201, and may correspond to a rim portion of glasses. The lens frame may be supported or located on the user's face in the state in which the user wears the wearable electronic device 200. For example, the lens frame 202 may position at least one of the display members 201 to correspond to the user's naked eye. According to an embodiment, the lens frame 202 may serve as a rim of a general eyeglass structure. In an embodiment, at least a part of the lens frame 202 may include a material having good thermal conductivity, for example, a metal material. A thermally conductive material may include, for example, a metal material, but is not limited thereto. Any material having good thermal conductivity may be used as a material for manufacturing the lens frame 202 even if it the material is not a metal material. The lens frame 202 is a structure substantially exposed to the exterior of the wearable electronic device 200, and may be easily processed or molded by including not only a thermally conductive metal material, but also a polymer such as polycarbonate. In the illustrated embodiment, the lens frame 202 may have a closed curve shape surrounding the display member 201.

According to various embodiments, the lens frame 202 may be formed by coupling at least two frames to each other. For example, the lens frame 202 may include a first frame 202a and a second frame 202b. According to the embodiment illustrated in FIG. 2, the first frame 202a may form a frame structure of a portion facing the user's face when the user wears the wearable electronic device 200, and the second frame 202b may form a frame structure of a portion in a gaze direction viewed by the user when the user wears the wearable electronic device 200. However, the specific shapes of the first frame 202a and the second frame 202b and the coupling relationship between these structures may vary according to embodiments.

According to various embodiments, the wearable electronic device 200 may include a camera module 251 (e.g., the camera module 180 in FIG. 1) and/or a sensor module 253 (e.g., the sensor module 176 in FIG. 1) disposed on the lens frame 202. A flexible printed circuit board 205 may electrically connect the camera module 251 and/or the sensor module 203 to a circuit board 241 (e.g., a printed circuit board (PCB), a printed board assembly (PBA), a flexible PCB (FPCB), or a rigid-flexible PCB (RFPCB)) accommodated in the wearing member 203. The camera module 251 may acquire an image of a surrounding object or environment through a first optical hole 221 provided in the lens frame 202. The camera module 251 and/or the first optical hole 221 may be disposed at each of the opposite side ends of the lens frame 202 (e.g., the second frame 202b), for example, the opposite ends of the lens frame 202 (e.g., the second frame 202b) in the X direction. A processor (e.g., the processor 120 in FIG. 1) of the electronic device 200 may recognize an object or an environment based on an image acquired via the camera module 251. In some embodiments, the wearable electronic device 200 (e.g., the processor 120 or the communication module 190 in FIG. 1) may transmit the image acquired via the camera module 251 to an external electronic device (e.g., the electronic device 102 or 104 or the server 108 FIG. 1) to request information about the corresponding image.

According to various embodiments, the flexible printed circuit board 205 may extend from the circuit board 241 into the interior of the lens frame 202 across the hinge structure 229. According to an embodiment, the flexible printed circuit board 205 may be disposed on at least a portion of the periphery of the display member 201 inside the lens frame 202. For example, the camera module 251 and/or the sensor module 253 may be disposed substantially within the lens frame 202 using the flexible printed circuit board 205, and may be disposed around the display member 201.

According to various embodiments, the sensor module 253 may include a proximity sensor and may be electrically connected to the circuit board 241 via the flexible printed circuit board 205. The sensor module 253 may detect whether or not the user's body (e.g., a finger) approaches the display member 201 through the second optical hole 223 provided in the second frame 202b or may detect whether or not the user's body remains close to the display member 201 within a certain distance. The sensor module 253 and/or the second optical hole 223 may be disposed in the central portion of the lens frame 202, for example, between the camera modules 251 in the X direction. In this embodiment, in the wearable electronic device 200, a configuration including one sensor module 253 (e.g., a proximity sensor) and one second optical hole 223 is exemplified. However, the disclosure is not limited thereto, the number and/or positions of sensor modules 253 and second optical holes 223 may be variously changed in order to more accurately detect the approach or proximity state of the user's body.

According to various embodiments, when the approach of the user's body is detected via the sensor module 253 (e.g., a proximity sensor), the processor (e.g., the processor 120 in FIG. 1) may be set to perform a predetermined function. In some embodiments, when the approach of the user's body is detected, the processor 120 may store an image acquired via the camera module 251. For example, according to an operation mode of the wearable electronic device 200, the processor 120 may execute various functions based on a signal detected via a proximity sensor (e.g., the sensor module 253). In some embodiments, the sensor module 253 may include an eye tracking sensor (not illustrated). For example, the wearable electronic device 200 may track the user's gaze (e.g., a pupil) by including an eye tracking sensor, and may adjust the position and/or the size of an image output from a display module (e.g., the display module 160) and provided to the user via the display member 201 according to the user's gaze. For example, the eye tracking sensor may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be referred to as a photo detector or a photo sensor.

In some embodiments, the sensor module 253 may include an illuminance detection sensor (not illustrated). For example, in the wearable electronic device 200, the illuminance detection sensor is a sensor that detects the illuminance (or brightness) around the user's eyes or the wearable electronic device 200, and the wearable electronic device 200 may control the light output device based on the illuminance (or brightness) detected via the illuminance detection sensor.

According to various embodiments, the camera module 251 may be replaced with the sensor module 253 or, conversely, the sensor module 253 may be replaced with the camera module 251. According to various embodiments, camera modules 251 and/or sensor modules 253 may be provided in the lens frame 202 at positions different from those illustrated in FIGS. 2 and 3. In addition, the wearable electronic device 200 may include a larger number of camera modules and/or sensor modules in addition to the camera modules 251 and/or the sensor modules 253 illustrated in FIGS. 2 and 3. The wearable electronic device 200 may further include an eye tracking camera and/or a gesture detecting camera disposed on the lens frame 202.

According to various embodiments, the wearable electronic device 200 may include at least one light-emitting unit in an area adjacent to the camera module 251. According to an embodiment, the light-emitting unit may emit light in a visible light band or an IR band. According to an embodiment, the light-emitting unit may include a light-emitting diode (LED). For example, the light-emitting unit may provide a light source interlocked with state information of the wearable electronic device 200 and/or the operation of the camera module 251 under the control of a lighting device driver (e.g., the lighting device driver 346 of FIG. 4).

According to various embodiments, the wearable electronic device 200 may include a pair of wearing members 203 corresponding to temples of eyeglasses. For example, the pair of wearing members 203 may include a first wearing member 203a and a second wearing member 203b. The pair of wearing members 203 may each extend from the lens frame 202 and may be partially supported or located on the user's body (e.g., the ears) together with the lens frame 202. In an embodiment, the wearing members 203 may be rotatably coupled to the lens frame 202 via hinge structures 229 corresponding to endpieces of the glasses, respectively, and in the state in which the wearable electronic device 200 is not worn, the user may conveniently carry or store the wearable electronic device 200 by folding the wearing members 203 to overlap the lens frame 202. A portion of each hinge structure 229 may be mounted on the lens frame 202, and another portion may be accommodated or mounted into the corresponding wearing member 203. Hinge covers 227 may be mounted on the lens frame 202 to cover portions of the hinge structures 229, respectively, and the other portions of the hinge structures 229 may be accommodated or covered, respectively, between inner cases 231 and outer cases 233, which will be described later.

According to various embodiments, the wearable electronic device 200 may include various electronic components located in the wearing member 203, for example, a circuit board 241, a battery 243, a display module (e.g., the display module 160 in FIG. 1), and/or a speaker module 245. Various electronic components accommodated in the wearing members 203 may be electrically connected to each other via a circuit board (e.g., the circuit board 241), a flexible printed circuit board (e.g., the flexible printed circuit board 205), a conductive cable, or a connector (e.g., the connectors C in FIG. 4). In an embodiment, at least one integrated circuit chip may be mounted on the circuit board 241, and circuit devices such as the processor 120, the communication module 190, the power management module 188, or the memory 130 in FIG. 1 may be provided in the integrated circuit chip. Various electronic components accommodated in the wearing members 203 may be mounted on the circuit board 241.

According to various embodiments, the circuit board 241 may include a first circuit board 241a and a second circuit board 241b, which are disposed in the pair of wearing members, respectively. In addition, the wearable electronic device 200 may further include another circuit board not illustrated in the drawings. For example, the wearable electronic device 200 may further include an auxiliary circuit board that supports the first circuit board 241a and/or the second circuit board 241b. According to various embodiments, various electronic components included in the wearable electronic device 200 may be mounted on the first circuit board 241a and/or the second circuit board 241b, and some electronic components may be mounted on the auxiliary circuit board.

According to various embodiments, each wearing member 203 may include an inner case 231 and an outer case 233. The inner case 231 is, for example, a case configured to come into direct contact with the user's body, and may be made of a material having a low thermal conductivity (e.g., a synthetic resin). The outer case 233 may include, for example, a material (e.g., a metal material) capable of at least partially transferring heat, and may be coupled to face the inner case 231. In an embodiment, a circuit boards 241 or a speaker modules 245 may be accommodated in a space separated from a battery 243 in each wearing member 203. In the illustrated embodiment, the inner case 231 may include a first case 231a including the circuit board 241 or the speaker module 245 and a second case 231b accommodating the battery 243, and the outer case 233 may include a third case 233a coupled to face the first case 231a and a fourth case 233b coupled to face the second case 231b. For example, the first case 231a and the third case 233a (hereinafter, "first case parts 231a and 233a") may be coupled to accommodate the circuit board 241 or the speaker module 245, and the second case 231b and the fourth case 233b (hereinafter, "second case parts 231b and 233b") may be coupled to accommodate the battery 243. According to an embodiment, the wearable electronic device 200 may further include a wire 246 for electrically connecting the circuit board 241 and the battery 243 located in each wearing member 203.

According to various embodiments, the first case parts 231a and 233a may be rotatably coupled to the lens frame 202 via the hinge structure 229, respectively, and the second case parts 231b and 233b may be connected to or mounted on the ends of the first case parts 231a and 233a via the connection members 235, respectively. In some embodiments, the portions of the connection members 235 that come into contact with the user's body may be made of a material having low thermal conductivity (e.g., an elastic material such as silicone, polyurethane, or rubber), and the portions of the connection members 235 that do not come into contact with the user's body may be made of a material having a high thermal conductivity (e.g., a metal material). For example, when heat is generated from the circuit boards 241 or the batteries 243, the connection members 235 block heat from being transferred to the portions that come into contact with the user's body, and may distribute or release the heat through the portions that do not come into contact with the user's body. In some embodiments, the portions of the connection members 235 that are configured to come into contact with the user's body may be interpreted as portions of the inner cases 231, and the portions of the connection members 235 that do not come into contact with the user's body may be interpreted as portions of the outer cases 233.

Figure 4:
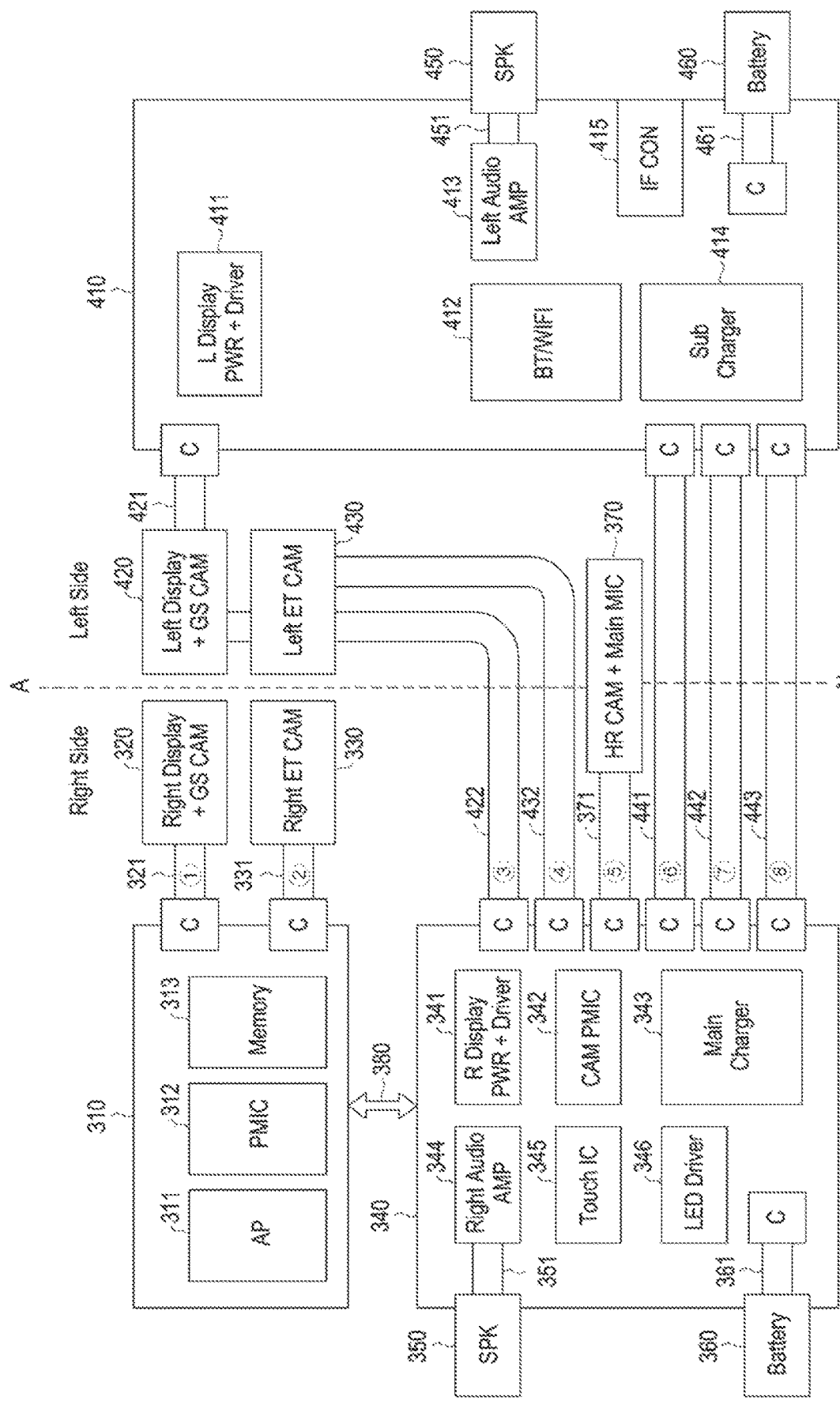
FIG. 4 is a block diagram illustrating an electrical connection relationship between various electronic components included in a wearable electronic device according to some embodiments.

FIG. 4 is a block diagram illustrating an electrical connection relationship between various electronic components included in the wearable electronic device 200 according to some embodiments.

According to some embodiments, the wearable electronic device 200 may include a plurality of electronic components, for example, a processor 311 (e.g., an application processor (AP), a power management module 312 (e.g., PMIC), a memory 313, display modules 320 and 420, camera modules 330, 370, and 430, display power and/or driver 341 and 411, a camera power management module 342, chargers 343 and 414, audio modules 344 and 413, a touch circuit 345, a lighting device driver 346, a short-range communication module 412, an intermediate frequency (IF) connector 415, sound output modules 350 and 450, and batteries 360 and 460. In some embodiments, at least one of these components (e.g., the intermediate frequency (IF) connector 415) may be omitted, or one or more other components may be added to the wearable electronic device 200. In some embodiments, some of these components (e.g., a display module and/or a camera module) may be integrated into one component (e.g., display modules 320 and 420).

According to an embodiment, as illustrated in FIGS. 3 and 4, with reference to the imaginary line A-A' dividing the first display member 201a and the second display member 201b to the left and right, the first circuit board 310 and the second circuit board 410 and a plurality of various electronic components mounted thereon may be separately disposed.

According to some embodiments, the wearable electronic device 200 may include a first circuit board 310 and a second circuit board 410 as the circuit boards, and may further include an auxiliary circuit board 340. According to an embodiment, the first circuit board 310 and the second circuit board 410 may be disposed in the first wearing member 203a and the second wearing member 203b, respectively, and the auxiliary circuit board 340 may be disposed in the first wearing member 203a as an auxiliary circuit board 340 for the first circuit board 310 and may be stacked on and connected to the first circuit board 310. For example, the auxiliary circuit board 340 may be electrically connected to the first circuit board 310 using an interposer 380. However, the disclosure is not necessarily limited thereto. For example, the first circuit board 310 and the second circuit board 410 may not be disposed in the first wearing member 203a and the second wearing member 203b, respectively, but may be disposed in the lens frame 202.

According to some embodiments, the plurality of electronic components included in the wearable electronic device 200 may be distributed and disposed on the first circuit board 310, the second circuit board 410, and the auxiliary circuit board 340. According to some embodiments, it is possible to provide an arrangement structure of internal components (e.g., parts) of the wearable electronic device for preventing the concentration of centers of gravities and distributing the weight. For example, referring back to FIGS. 2 and 3, within the wearing members 203, the circuit boards 241 may be disposed adjacent to the lens frame 202, and electronic components (e.g., the batteries 243) heavier than the circuit boards 241 may be disposed farther away from the lens frame 202 than the circuit boards 241. Accordingly, it is possible to alleviate the concentration of the weight of the wearable electronic device 200 toward the lens frame 202 or on the user's face in the worn state.

The speaker modules 245 may be disposed, respectively, in the wearing members 203 between the circuit boards 241 and the batteries 243 to be positioned close to the user's ears in the state in which the user wears the wearable electronic device 200.

Referring to FIG. 4, some of the plurality of electronic components included in the wearable electronic device 200 may be mounted on the first circuit board 310. For example, the processor 311, the power management module 312, and the memory 313 may be mounted on the first circuit board 310. According to another embodiment, some other electronic components among the plurality of electronic components included in the wearable electronic device 200 may be mounted on the auxiliary circuit board 340. For example, the display power and/or driver 341, the camera power management module 342, the charger 343, the audio module 344, the touch circuit 345, and the lighting device driver 346 may be mounted on the auxiliary circuit board 340. According to some embodiments, concentration of heat may be prevented by arranging the processor 311, the power management module 312, and the memory 313 having a relatively high calorific value in an area separated from other electronic components. According to an embodiment, some other electronic components among the plurality of electronic components included in the wearable electronic device 200 may be mounted on the second circuit board 410. For example, the display power and/or driver 411, the wireless LAN module 412, the audio module 413, the charger 414, and the IF connector 415 may be mounted on the second circuit board 410.

According to some embodiments, some components among the plurality of electronic components included in the wearable electronic device 200 may be disposed on the frame 202 rather than in the wearable members. For example, the display modules 320 and 420 and the camera modules 330, 370, and 430 may be disposed on the frame 202 of the wearable electronic device 200. According to an embodiment, the first display module 320 and the first camera module 330 may be disposed in a portion of the frame 202 that corresponds to the first display member 201a of the wearable electronic device 200, and the second display 420 and the second camera module 430 may be disposed in a portion of the frame 202 that corresponds to the second display member 202a of the wearable electronic device 200. According to some embodiments, some components (e.g., the third camera module 370) among the plurality of electronic components included in the wearable electronic device 200 may be disposed on the first display member 201a or the second display member 202a, or may be disposed over the first display member 201a and the second display member 202a.

Referring to FIG. 4, the wearable electronic device 200 according to some embodiments may be configured to manage plurality of electronic components and to perform various calculations, determination and control using the processor 311, the power management module 312, and the memory 313. The processor 311, the power management module 312, and the memory 313 may be mounted on, for example, the first circuit board 310, and may be disposed in the first wearing member 203a of the wearable electronic device 200. In addition, a plurality of signal lines for electrically connecting the remaining electronic components to the electronic components disposed on the first circuit board 310 may be provided.

The various electronic components described above may be electrically connected to each other via the circuit boards 310, 340, and 410, the flexible printed circuit board (e.g., the flexible printed circuit board 205), and signal lines (e.g., the conductive cables or connectors C).

Hereinafter, a case in which different electronic components are electrically connected via the connectors C may be described as an example. For example, the first display module 320 and the first camera module 330 may be connected to the first circuit board 310 via a first connector 321 and a second connector 331. In addition, for example, the second display module 420 and the second camera module 430 may be connected to the auxiliary circuit board 340 via a third connector 422 and a fourth connector 432. According to an embodiment, in the state in which one end of the third connector 422 is connected to the second circuit board 410 (e.g., the state of being connected to a $(3-1)^{th}$ connector 421), and the other end of the third connector 422 may be connected to the auxiliary circuit board 340. The second display module 420 and the second camera module 430 may be disposed on one side (e.g., left) with reference to the imaginary line A-A' dividing the first display member 201a and the second display member 201b to the left and right. Alternatively, the electrical connection thereof may be connected to the auxiliary circuit board 340 disposed on the other side (e.g., right).

In addition, for example, the third camera module 370 may be connected to the auxiliary circuit board 340 via a fifth connector 371. For example, the third camera module 370 may be disposed on the first display member 201a or the second display member 202a or may be disposed over the first display member 201a and the second display member 202a, and may be connected to the auxiliary circuit board 340 via the fifth connector 371. In addition, between the second circuit board 410 and the auxiliary circuit board 340, a sixth connector 441 for communication signal transmission, a seventh connector 442 for data transmission, and an eighth connector 443 for power transmission may be provided, and a plurality of electronic components may be electrically connected to each other via these connectors. In addition, the auxiliary circuit board 340 may be provided with a connector 351 connecting the audio module 344 and the first sound output module 350 to each other, and a connector 361 connecting the auxiliary circuit board 340 and the battery 360 to each other. In addition, the second circuit board 410 may be provided with a connector 451 connecting the audio module 413 and the second sound output module 450 to each other, and a connector 461 connecting the second circuit board 410 and the battery 460 to each other.

Although FIG. 4 illustrates an example in which all of eight connectors in total, except for the connectors 351, 361, 451, and 461 related to the sound output module and the batteries, are connected to the first circuit board 310 and the auxiliary circuit board 340 of the wearable electronic device 200, it should be noted that the disclosure is not necessarily limited thereto.

The aforementioned connectors may be board-to-board (BTB) connectors that connect circuit boards to each other. The lens frame (e.g., the lens frame 202 in FIG. 2) includes a connection member (e.g., the connection member 254 in FIG. 3) between the first display member 201a and the second display member 202a, and at least one of the connectors may be disposed to penetrate the connection member. For example, in the embodiment of FIG. 4, the third connector 422, the fourth connector 432, the fifth connector 371, the sixth connector 441, the seventh connector 442, and the eighth connector 443 may be disposed to penetrate the connection member 254.

According to some embodiments, the first circuit board 310, the second circuit board 410, the auxiliary circuit board 340, and a plurality of various electronic components mounted thereon may be randomly arranged without any reference. Even in this case, a large number of signal lines for connecting a plurality of electronic components may be required, and these signal lines may be complicatedly entangled with each other and may cause problems in product design and heat generation of electronic components.

Figure 5:
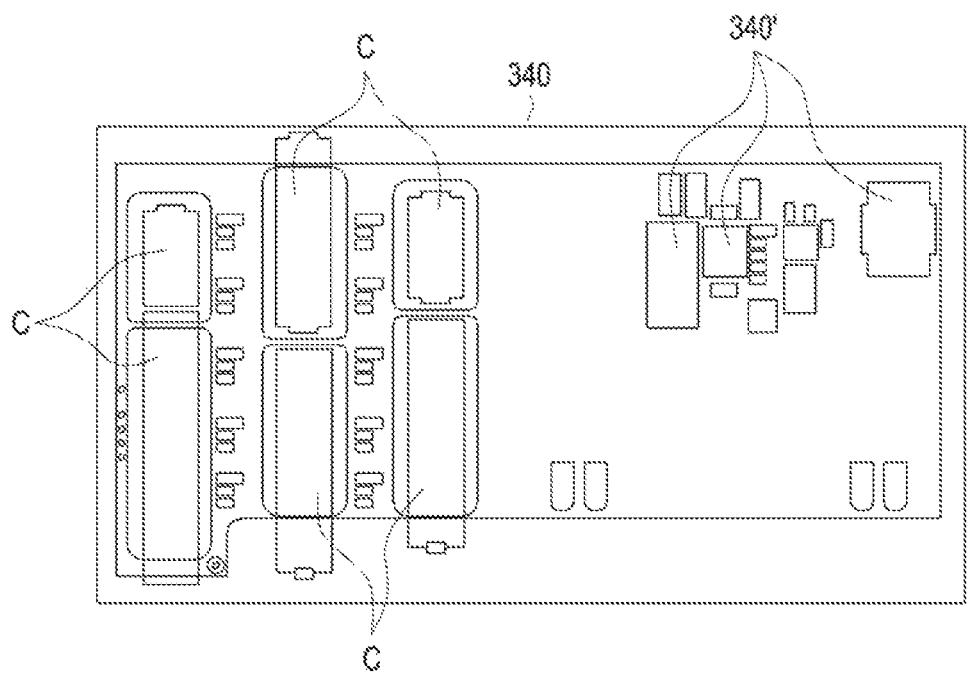
FIG. 5 is a view illustrating connection terminals of connectors provided on a board according to an embodiment.

FIG. 5 is a view illustrating connection terminals of connectors C provided on a board (e.g., the auxiliary circuit board 340) according to an embodiment.

According to some embodiments, a plurality of electronic components 340' may be mounted on a board (e.g., the auxiliary circuit board 340). In addition, connection terminal portions into which connectors C for electrical connection between the electronic components 340' mounted on a certain board (e.g., the auxiliary circuit board 340) and other electronic components disposed outside the board can be inserted may be provided.

Referring to FIG. 5, the area occupied by the connection terminals of the connectors C may be significantly large compared to the area of the board and the electronic components 340' mounted on the board. With this, it may be inferred that when more connectors for electrically connecting a plurality of electronic components are provided in the wearable electronic device 200, the volume of the wearable electronic device 200 may be increased, which may not accord with the recent trend of weight reduction and miniaturization of electronic devices. For example, in the case of the wearable electronic device 200, the connectors C may be arranged through or across a connection member (e.g., the connection member 254 (or a bridge) in FIG. 3) having a relatively narrow cross-sectional area compared to other portions in the wearable electronic device 200 or a hinge structure 229 (or an endpiece). When the wearable electronic device 200 is provided with a large number of connectors C as described above, it may cause restrictions in product design and/or manufacturing.

Figure 6:
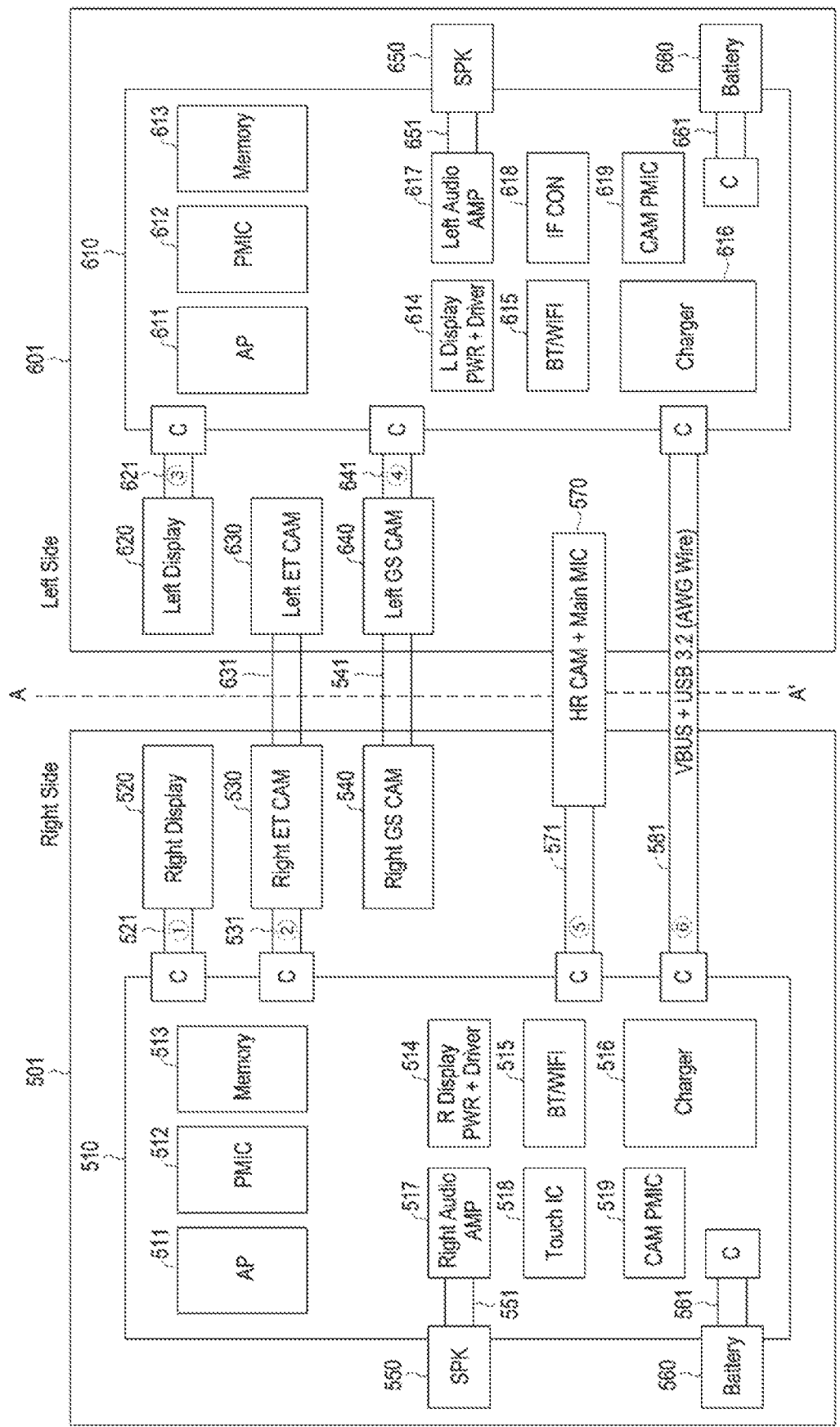
FIG. 6 is a block diagram illustrating an electrical connection relationship between various electronic components included in a wearable electronic device according to various embodiments of the disclosure.

FIG. 6 is a block diagram illustrating an electrical connection relationship between various electronic components included in the wearable electronic device 200 according to various embodiments of the disclosure.

According to various embodiments of the disclosure, the wearable electronic device 200 may include a plurality of electronic components, for example, processors 511 and 611 (application processors (APs)), power management modules 512 and 612 (e.g., a power management integrated circuit (PMIC)), memories 513 and 613, display modules 520 and 620, camera modules 530, 540, 570, 630, and 640, display power and/or drivers 514 and 614, short-range communication module 515 and 615, chargers 516 and 616, audio modules 517 and 617, a touch circuit 518, an IF connector 618, camera power management modules 519 and 619, sound output modules 550 and 650, and batteries 560 and 660. In some embodiments, at least one of these components (e.g., the IF connector 618) may be omitted, or one or more other components may be added to the wearable electronic device 200. In some embodiments, some of these components (e.g., a display module and/or a camera module) may be integrated into one component (e.g., display modules 520 and 620). In some embodiments, in addition to the above-described components, the electronic device 200 may include a magnetic (geomagnetic) sensor capable of measuring an azimuth using a magnetic field or a line of magnetic force and/or a Hall sensor capable of acquiring movement information (e.g., a movement direction or a movement distance) using the intensity of a magnetic field.

For example, the processors 511 and 611 may determine a movement of the wearable electronic device 200 and/or a movement of the user based on information acquired from the magnetic (geomagnetic) sensor and/or the Hall sensor.

According to various embodiments of the disclosure, the wearable electronic device 200 may include a first circuit board 510 and a second circuit board 610 as circuit boards.

In various embodiments of the disclosure, a plurality of electronic components included in the wearable electronic device 200 may be substantially symmetrically distributed and disposed on the first circuit board 510 and the second circuit board 610.

Referring to FIGS. 3 and 6 together, with reference to the imaginary line A-A' dividing the first display member 201a and the second display member 201b to the left and right, the first and second circuit boards 510 and 610 and a plurality of various electronic components mounted thereon may be symmetrically arranged left and right, respectively.

According to an embodiment, a plurality of electronic components may be disposed on the first circuit board 510 to form an operating circuit unit for operating the first display member 201a and/or displaying an object. Referring to FIG. 6, for example, the first processor 511, the power management module 512, the memory 513, the display power and/or driver 514, the short-range communication module 515, the charger 516, the audio module 517, the touch circuit 518, and the camera power management module 519 may be mounted on the first circuit board 510 and may form a first operating circuit unit. In addition, the first operating circuit unit may configure a first operating system 501 for operating the first display member 201a and/or displaying an object together with the first display module 520, the first camera module 530, and the second camera module 540 disposed at a position corresponding to the first display member 201a with reference to the imaginary line A-A'.

In addition, according to an embodiment, a plurality of electronic components may be disposed on the second circuit board 620 to form an operating circuit unit for operating the second display member 201b and/or displaying an object. For example, the second processor 611, the power management module 612, the memory 613, the display power and/or driver 614, the short-range communication module 615, the charger 616, the audio module 617, the IF connector 618, and the camera power management module 619 may be mounted on the second circuit board 610 and may configure a second operating circuit unit. In addition, the second operating circuit unit may configure a second operating system 601 together with the second display module 620, the third camera module 630, and the fourth camera module 640 disposed at a position corresponding to the second display member 201a with reference to the imaginary line A-A'.

According to an embodiment, as illustrated in FIG. 6, the fifth camera 570 may be connected to the first circuit board 510 to form a part of the first operating system 501, but is not necessarily limited thereto. Unlike the drawings, the fifth camera 570 may be connected to the second circuit board 610 to form a part of the second operating system 601.

According to various embodiments of the disclosure, it is possible to provide two independent first and second operating systems 501 and 601 that manage image or video display of the first display member 201a and the second display member 201b. For example, according to various embodiments of the disclosure, it is possible to provide a dual operating system. The first operating system 501 and the second operating system 601 may include processors 511 and 611, power management modules 512 and 612, and memories 513 and 613, respectively, so that each of the first and second operating systems can control one or more different components and can perform various data processing or operation, power distribution, and/or data storage.

According to an embodiment, the first operating system 501 may include a first display power and/or driver 514, through which an AR object may be displayed or controlled on the first display member 201a.

According to an embodiment, the first operating system 501 may perform communication with an external electronic device (e.g., the external electronic device 700 of FIG. 7) or a server by including the short-range wireless communication module 515. The first operating system 501 may include at least one component that enables communication with an external electronic device or a server. In an embodiment, the short-range communication module may include a short-range wireless communication interface, a mobile communication interface and/or a broadcasting receiving circuit (a broadcasting receiver). For example, the short-range wireless communication interface may include a Bluetooth communication interface, a Bluetooth low energy (BLE) communication interface, a near field communication (NFC)/radio frequency identification (RFID) interface, a wireless local area network (WLAN) communication interface, a Zigbee communication interface, or an infrared data association (IrDA) communication interface. The interfaces include a Wi-Fi direct (WFD) communication interface, an ultra-wideband (UWB) communication interface, and an Ant+ communication interface, but components included in the short-range wireless communication interface are not limited thereto.

According to an embodiment, the first operating system 501 may charge the battery 560 using received regulated power (e.g., direct current (DC) power) by including the charger 516. The charger 516 may adjust at least one of the voltage or current of the received power to transmit the adjusted voltage or current to the battery 560.

According to an embodiment, the first operating system 501 may include an audio module 517 for conversion between sound and electrical signals or amplification of sound and electrical signals, and a camera power management module 519 for managing power supplied to a camera. In addition, the first operating system 501 may further include a touch sensor configured to detect the user's touch on the wearable electronic device 200 and a touch circuit 518 for operating the touch sensor.

The description of each component of the above-described first operating system 501 may be applicable to the description of each component of the second operating system 601.

The plurality of electronic components may be substantially symmetrically distributed and disposed on the first circuit board 510 and the second circuit board 610. Two identical electronic components that mainly perform the same function may be provided and disposed on the first circuit board 510 and the second circuit board 610. However, the disclosure is not necessarily limited thereto. Some components having different functions (e.g., the touch circuit 518 and the IF connector 618) may be selectively disposed on the first circuit board 510 and the second circuit board 610.

Among the plurality of electronic components included in the wearable electronic device 200, some components may be disposed on the frame (e.g., the frame 202 in FIG. 2), rather than the wearing members (e.g., the wearing members 203 in FIG. 3). For example, the display modules 520 and 620 and the plurality of camera modules 530, 540, 570, 630, and 640 may be disposed on the frame 202 of the wearable electronic device 200. According to an embodiment, the first display module 520, the first camera module 530, and the second camera module 540 may be disposed in a portion of the frame 202 that corresponds to the first display member 201a of the wearable electronic device 200, and the second display 620, the third camera module 630, and the fourth camera module 640 may be disposed in a portion of the frame 202 that corresponds to the second display member 202a of the wearable display device 200. In addition, some components (e.g., the fifth camera module 570) among the plurality of electronic components included in the wearable electronic device 200 may be disposed on each of the first display member 201a and the second display member 202a, or may be disposed over the first display member 201a and the second display member 202a.

Among the above-described plurality of camera modules, the first camera module 530 and the third camera module 630 may be, for example, eye tracking (ET) camera modules. According to an embodiment, since the first camera module 530 and the third camera module 630 are camera modules for performing the same function as each other, the first camera module 530 and the third camera module 630 may be electrically connected to the first circuit board 510 to be managed by the first operating system 501. For example, the first camera module 530 and the third camera module 630 may photograph the trajectory of the user's eyes (e.g., pupils) or gaze, and may photograph a reflection pattern of light emitted to the user's eyes by a light-emitting unit. For example, the light-emitting unit may emit light in an infrared band for tracking the trajectory of the gaze using the first camera module 530 and the third camera module 630. For example, the light-emitting unit may include an IR LED. According to an embodiment, in order to make a virtual image projected to the display members 201a and 201b correspond to the direction at which the user's pupils gaze, the processors 511 and 611 may adjust the position of the virtual image.

Among the plurality of camera modules described above, the second camera module 540 and the fourth camera module 640 may be, for example, camera modules for recognizing a gesture (e.g., a hand gesture). According to an embodiment, since the second camera module 540 and the fourth camera module 640 are camera modules for performing the same function as each other, the second camera module 540 and the fourth camera module 640 may be electrically connected to the second circuit board 610 to be managed by the second operating system 601. According to an embodiment, the second camera module 540 and the fourth camera module 640 may be global shutter (GS) type cameras, and 360-degree spatial (e.g., omnidirectional) positional recognition and/or movement recognition may be provided using a camera that supports 3 degrees of freedom (DoF) or 6 DoF. According to an embodiment, the second camera module 540 and the fourth camera module 640 may perform a movement path tracking function (simultaneous localization and mapping (SLAM)) and a user movement recognition function using a plurality of global shutter type cameras of the same standard and performance as stereo cameras. According to an embodiment, the second camera module 540 and the fourth camera module 640 may include an IR camera, a time of flight (ToF) camera or a structured light camera). For example, the IR camera may be operated as at least a part of a sensor module (e.g., the sensor module 253 in FIG. 3) for detecting a distance to a subject.

According to an embodiment, at least one light-emitting part may be included in an area adjacent to the first camera module 530 and the third camera module 630 and/or in an area adjacent to the second camera module 540 and the fourth camera module 640. For example, the light-emitting unit may provide a light source interlocked with the state information of the wearable electronic device 200 and/or the operations of the camera modules 530, 630, 540, and 640.

According to an embodiment, the fifth camera module 570 may capture an external image. According to an embodiment, the fifth camera module 570 may be a global shutter type or rolling shutter (RS) type camera. According to an embodiment, the fifth camera module 570 may capture an external image through a second optical hole (e.g., the second optical hole 223 in FIG. 2). For example, the fifth camera module 570 may include a high-resolution color camera, and may be a high resolution (HR) or photo video (PV) camera. In addition, the fifth camera module 570 may provide an auto focus (AF) function and an optical image stabilizer (OIS) function.

According to an embodiment, a microphone module (e.g., the input module 150 and/or the audio module 170 in FIG. 1) may be included in an area adjacent to the fifth camera module 570. For example, the microphone module may be disposed on at least a portion of the connection member 254 or at least a portion of the frame 202. According to an embodiment, the microphone module may convert sound into an electrical signal, and the user's voice may be more clearly recognized using voice information (e.g., sound) acquired by the at least one microphone module. For example, based on the acquired voice information and/or additional information (e.g., low-frequency vibration of the user's skin and bone), the wearable electronic device 200 may distinguish voice information and ambient noise from each other. For example, the wearable electronic device 200 may clearly recognize the user's voice and may perform a function of reducing ambient noise (e.g., noise canceling).

Various sensor modules including a touch sensor may be further included in an area adjacent to the fifth camera module 570. For example, the touch sensor may be disposed on at least a portion of the connection member or at least a portion of the frame 202. The user's touch input may be detected using the touch sensor.

According to various embodiments of the disclosure, various electronic components included in the wearable electronic device 200 may be electrically connected to each other via circuit boards 510 and 610, a flexible printed circuit board (e.g., the flexible printed circuit board 205), and signal lines (e.g., conductive cables or connectors C). Hereinafter, a case in which a plurality of different electronic components are electrically connected using connectors C will be described as an example.

According to an embodiment, the first display module 520 may be connected to the first circuit board 510 via the first connector 521. In addition, the first camera module 530 may be connected to the first circuit board 510 via the second connector 531. Unlike the embodiment illustrated in FIG. 4, in the embodiment illustrated in FIG. 6, the third camera module 630 may be connected to the first circuit board 510 by a $(2\text{-}1)^{th}$ connector 631. Through this, the first camera module 530 and the third camera module 630 may be synchronized together on the first circuit board 510. In addition, for power, the first camera module 530 and the third camera module 630 may use the first battery 560 in common. Accordingly, images or videos captured via the first camera module 530 and the third camera module 630 may be processed in a batch.

According to an embodiment, the second display module 620 may be connected to the second circuit board 610 via the third connector 621. In addition, the fourth camera module 640 may be connected to the second circuit board 610 via the fourth connector 641. Unlike the embodiment illustrated in FIG. 4, in the embodiment illustrated in FIG. 6, the second camera module 540 may be connected to the second circuit board 610 by a (4-1)$^{th}$ connector 541. Through this, the second camera module 540 and the fourth camera module 640 may be synchronized together on the second circuit board 510 and may use the second battery 660 in common. Accordingly, images or videos captured via the second camera module 540 and the fourth camera module 640 may be processed in a batch.

According to an embodiment, the first camera module 530 and the second camera module 540 may be disposed at a position corresponding to the first display member (e.g., the first display member 201*a* of FIG. 3), for example, on one side (e.g., right) with reference to the imaginary line A-A' indicated in FIGS. 3 and 6. In addition, the third camera module 630 and the fourth camera module 640 may be disposed at a position corresponding to the second display member (e.g., the second display member 201*b* in FIG. 3), for example, on the other side (e.g., left) with reference to the imaginary line A-A' indicated in FIGS. 3 and 6.

According to various embodiments of the disclosure, one component and another component are located, respectively, on one side (e.g., right) and the other side (e.g., left) with reference to the imaginary line A-A' illustrated in FIGS. 3 and 6. When the above-mentioned components perform similar or identical functions, the components may be used in synchronization with each other by connecting the components together to a circuit board on one side using connectors. For example, the first camera module 530 and the third camera module 630 are located, respectively, on one side (e.g., right) and the other side (e.g., left) with reference to the imaginary line A-A' indicated in FIGS. 3 and 6. Since the first camera module 530 and the third camera module 630 perform the same function (e.g., eye tracking), the first and third camera modules may be connected to the first circuit board 510 using connectors (e.g., 531 and 631). In addition, for example, the second camera module 540 and the fourth camera module 640 are located, respectively, on one side (e.g., right) and the other side (e.g., left) with reference to the imaginary line A-A' indicated in FIGS. 4 and 6. Since the second camera module 540 and the fourth camera module 640 perform the same function (e.g., gesture recognition), the second and fourth camera modules may be connected to the second circuit board 610 using connectors (e.g., 541 and 641).

As described above, when the camera modules are disposed, respectively, on the left and right sides with reference to the imaginary line A-A' indicated in FIGS. 3 and 6, it is possible to reduce unnecessary arithmetic operations by causing one operating system (the first operating system 501 or the second operating system 601) to be managed when the camera modules having the same function perform the same function. In addition, with respect to a plurality of camera modules having different functions, it is possible to balance power consumption by causing the first operating system 501 or the second operating system 601 to be managed separately for respective functions. FIG. 6 illustrates an embodiment in which the first camera module 530 and the third camera module 630 having the same function (e.g., eye tracking) are connected to the first operating system 501, and the second camera module 540 and the fourth camera module 640 having another same function (e.g., gesture recognition) are connected to the second operating system 601 is illustrated, the disclosure is not necessarily limited thereto. According to another embodiment (not illustrated), the first camera module 530 and the third camera module 630 may be connected to the second operating system 601, and the second camera module 540 and the fourth camera module 640 may be connected to the first operating system 501.

For example, the fifth camera module 570 may be connected to the first circuit board 510 via the fifth connector 571. However, the disclosure is not necessarily limited thereto, and the fifth camera module 570 may be connected to the second circuit board 610 via the fifth connector (not illustrated), which connects the fifth camera module 570 and the second circuit board 610 to each other. In addition, for example, a sixth connector 581 for display synchronization and/or data transmission between the first display member 201*a* and the second display member 201*b* may be provided to implement electrical connection between the first circuit board 510 and the second circuit board 610. The sixth connector 581 may be, for example, a connector that serves to synchronize tethering operations in communication modules provided on the first circuit board 510 and the second circuit board 520. Alternatively or additionally, the sixth connector 581 may be, for example, a connector (e.g., a VBUS) that transmits power information of the IF connector 618 to the first circuit board 510 and the second circuit board 520. Alternatively or additionally, the sixth connector 581 may be, for example, a connector (e.g., a USB) for transmitting data (or downloading data) between the first circuit board 510 and the second circuit board 520. For example, camera-related information processed by the first processor 511 of the first operating system 501 and camera-related information processed by the second processor 611 of the second operating system 601 may be bidirectionally transmitted or received via the sixth connector 581.

However, data transmission between the first operating system 501 and the second operating system 601 may not necessarily be performed only via the connector (e.g., the sixth connector 581). According to an embodiment, data transmission between the first operating system 501 and the second operating system 601 may also be performed via short-range communication modules (e.g., 515 and 615) each of which is disposed between the first operating system 501 and the second operating system 601. For example, large-capacity data transmission such as screen synchronization between the first operating system 501 and the second operating system 601 may be performed via a connector (e.g., the sixth connector 581), and small-capacity data transmission between the first operating system 501 and the second operating system 601 may be performed by short-range communication modules, which are included in the first operating system 501 and the second operating system 601, respectively.

In addition, the first circuit board 510 may be provided with a connector 551 connecting the audio module 517 and the first sound output module 550 to each other, and a connector 561 connecting the first circuit board 510 and the battery 560 to each other. In addition, the second circuit board 610 may be provided with a connector 651 connecting the audio module 617 and the second sound output module 650 to each other, and a connector 661 connecting the second circuit board 610 and the battery 660 to each other.

According to the embodiment illustrated in FIG. 6, four connectors may be connected to the first circuit board 510 of the wearable electronic device 200, except for connectors related to the sound output modules and the batteries.

However, the disclosure is not necessarily limited thereto, and other connectors (e.g., a communication connector and a left display and right display synchronization connector) may be further disposed between the first circuit board 510 and the second circuit board 610.

The aforementioned connectors may be board-to-board (BTB) connectors that connect circuit boards to each other. The lens frame (e.g., the lens frame 202 in FIG. 2) includes a connection member (e.g., the connection member 254 in FIG. 3) between the first display member 201*a* and the second display member 201*b*, and at least one of the connectors may be disposed to penetrate the connection member 254. For example, in the embodiment of FIG. 6, the $(2\text{-}1)^{th}$ connector 631, the $(4\text{-}1)^{th}$ connector 541, the fifth connector 571, and the sixth connector 581 may disposed to penetrate the connection member 254.

Referring to FIGS. 4 and 6 in comparison, unlike the embodiment illustrated in FIG. 4, in the wearable electronic device 200 according to an embodiment of the disclosure, a plurality of electronic components may be disposed on the first circuit board 510 and the second circuit 610, respectively, and may be made to configure systems that can operate independently of each other. According to an embodiment, the plurality of electronic components included in the wearable electronic device 200 may be symmetrically disposed on the first circuit board 510 and the second circuit board 610, respectively. In addition, the first circuit board 510 and a plurality of electronic components disposed thereon may configure a first operating system 501 capable of outputting an image or video in which AR is implemented to the first display member 201*a*, and the second circuit board 610 and a plurality of electronic components disposed thereon may configure a second operating system 601 capable of outputting an image or video in which AR is implemented to the second display member 201*b*. For example, according to various embodiments of the disclosure, a dual operating system including the first operating system 501 and the second operating system 601 may be configured using the plurality of electronic components, and by using the dual operating system, it is possible to provide an AR objects to both eye parts of the AR glasses. According to an embodiment, the first operating system 501 and the second operating system 601 may be operated in synchronization with each other and may be operated independently of each other. As mentioned above, in the camera modules having the same function, unnecessary arithmetic operations can be reduced by causing any one operating system (the first operating system 501 or the second operating system 601) to be managed separately. In addition, by reducing the number of connectors C, it is possible to solve restrictions in product design and/or manufacturing.

Table 1 below shows an example of the number of pins provided on the first circuit board 310, the second circuit board 410, and the auxiliary circuit board 340 of an operating system according to the embodiment illustrated in FIG. 4.

TABLE 1

| Type of board | Connector No. | Connector name | Number of pins (example) |
|---|---|---|---|
| First circuit board 310 | ① | Right display + GS CAM | 46 |
|  | ② | Right ET CAM | 29 |
|  |  | Total | 75 |
| Auxiliary circuit | ③ | Left display + GS CAM | 42 |

TABLE 1-continued

| Type of board | Connector No. | Connector name | Number of pins (example) |
|---|---|---|---|
| board 340 | ④ | Left ET CAM | 26 |
|  | ⑤ | HR CAM + Main MIC | 30 |
|  | ⑥ | BT/Wi-Fi | 27 |
|  | ⑦ | VBUS | 11 |
|  | ⑧ | VBAT | 12 |
|  |  | Total | 148 |
| Second circuit board 410 | ③ | Left display control | 15 |
|  | ⑥ | BT/Wi-Fi | 27 |
|  | ⑦ | VBUS | 11 |
|  | ⑧ | VBAT | 12 |
|  |  | Total | 65 |

For example, the first circuit board 310 is provided with 75 lines (including signal lines and power lines) for connection of a display (e.g., the right display) and camera modules (e.g., GS CAM and ET CAM). Thus, the number of pins at the ends of connectors may also be 75. In addition, for example, the auxiliary circuit board 340 is provided with 148 signal lines and power lines for a display (e.g., the left display), camera modules (e.g., GS CAM, ET CAM, and HR CAM), a short-range wireless communication module (BT/Wi-Fi), a bus power voltage (VBUS), and a battery power voltage (VBAT). Thus, the number of pins at the ends of connectors may be 148. In addition, for example, the second circuit board 410 is provided with 65 signal lines and power lines for a display control signal line, a short-range wireless communication module (BT/Wi-Fi), a VBUS, and a VBAT. Thus, the number of pins at the ends of connectors may be 65. The total number of pins of the operating system of Table 1 may be 288.

Table 2 below shows an example of the number of pins provided on the first circuit board 510 and the second circuit board 610 of a dual operating system according to the embodiment illustrated in FIG. 6.

TABLE 2

| Type of board | Connector No. | Connector name | Number of pins (example) |
|---|---|---|---|
| First circuit board 510 | ① | Right display | 30 |
|  | ② | Right ET CAM + Left ET CAM | 34 |
|  | ⑤ | HR CAM + Main MIC | 30 |
|  | ⑥ | VBUS | 7 |
|  |  | Total | 101 |
| Second circuit board 610 | ③ | Left display | 30 |
|  | ④ | Right GS CAM + Left GS CAM | 27 |
|  | ⑥ | VBUS | 7 |
|  |  | Total | 64 |

For example, the first circuit board 510 is provided with 101 signal lines and power lines for connection of a display (e.g., the right display), camera modules (e.g., ET CAM and HR CAM), and a VBUS to each other. Thus, the number of pins at the ends of connectors may also be 101. Here, in any one of the camera modules (e.g., an eye tracking camera (ET CAM)), by connecting signal lines and/or power lines of cameras, which correspond to the first display member (e.g., 201*a* in FIG. 2) and the second display member (e.g., 201*b* in FIG. 2), respectively, to the first circuit board 510, it is possible to use power in common and to reduce the number of lines (or the number of pins). In addition, for example, the second circuit board 610 may be provided with 64 signal lines and power lines for a display (the left display), camera modules (e.g., GS CAM), and a VBUS. Accordingly, the number of pins at the ends of connectors may also be 64. In a camera modules (e.g., a global shutter camera (GS CAM)), by connecting signal lines and/or power lines of cameras, which correspond to the first display member (e.g., 201a in FIG. 2) and the second display member (e.g., 201b in FIG. 2), respectively, to the second circuit board 610, it is possible to use power in common and to reduce the number of lines (or the number of pins).

According to the embodiment illustrated in FIG. 4 (or Table 1), the total number of pins provided in the operating system may be 288, but in the dual operating system according to the embodiment illustrated in FIG. 6 (or Table 2), a total of 165 pins may be provided. When comparing the embodiments illustrated in FIGS. 4 and 6, the number of signal lines and/or power lines (e.g., connectors) for connecting electronic components is reduced in FIG. 6 compared to FIG. 4.

Figure 7:
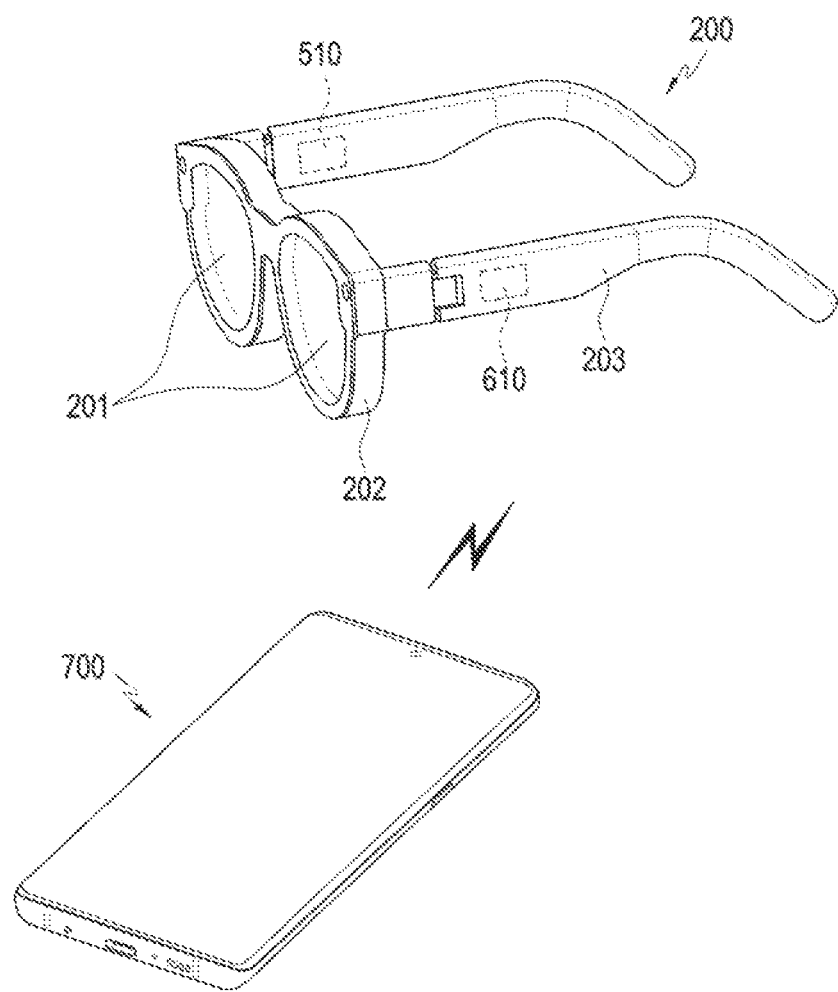
FIG. 7 is a view illustrating a network connection between an electronic device and an external electronic device according to various embodiments of the disclosure.

FIG. 7 is a view illustrating a network connection between a wearable electronic device 200 and an external electronic device 700 according to various embodiments of the disclosure. According to various embodiments, the wearable electronic device 200 may communicate with an external electronic device 700 under a network environment (e.g., the first network 198 in FIG. 1 (e.g., a short-range wireless communication network)), or may communicate with a server (e.g., server 108 in FIG. 1) by being tethered with the external electronic device 700.

According to an embodiment, the wearable electronic device 200 may include short-range communication modules (e.g., the short-range communication modules 515 and 615 in FIG. 6) on the first circuit board 510 and the second circuit board 610, respectively. Accordingly, the first operating system (e.g., the first operating system 501 in FIG. 6) and the second operating system (e.g., the second operating system 601 in FIG. 6) may be communicatively connected to an external electronic device 700 or a server 108 (e.g., the server 108 in FIG. 1) separately or independently using the short-range communication modules 515 and 615 to operate the first display member 201a and the second display member 201b, respectively. According to an embodiment, in each of the first operating system 501 and the second operating system 601 using the short-range communication modules 515 and 615, the wearable electronic device 200 may receive data from an external device 700, which is wirelessly tethered thereto, or may transmit video or image data toward the external electronic device 700.

Figure 8:
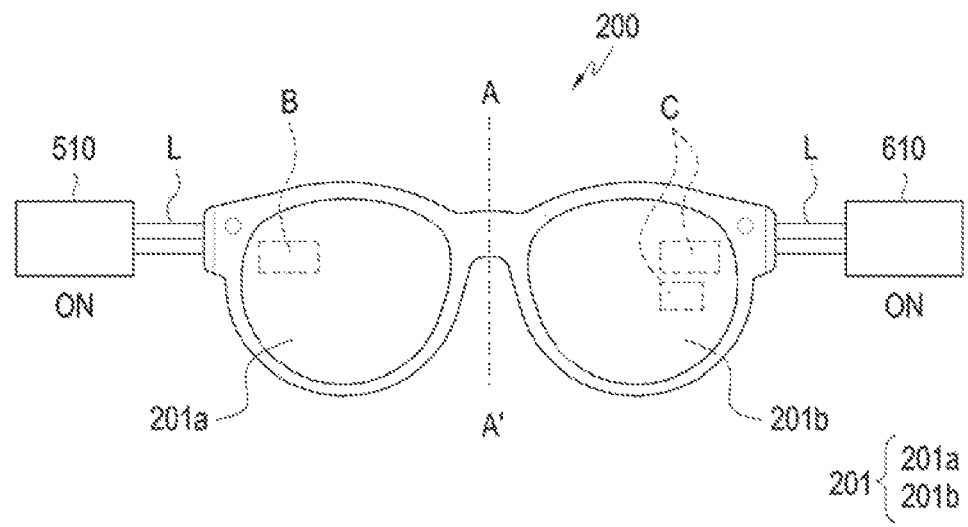
FIG. 8 is a view illustrating a state in which an image is output on a first display member and a second display member of an electronic device according to an embodiment of the disclosure.

FIG. 8 is a view illustrating a state in which an image is output on the first display member 201a and the second display member 201b of the wearable electronic device 200 according to an embodiment of the disclosure.

Figure 9:
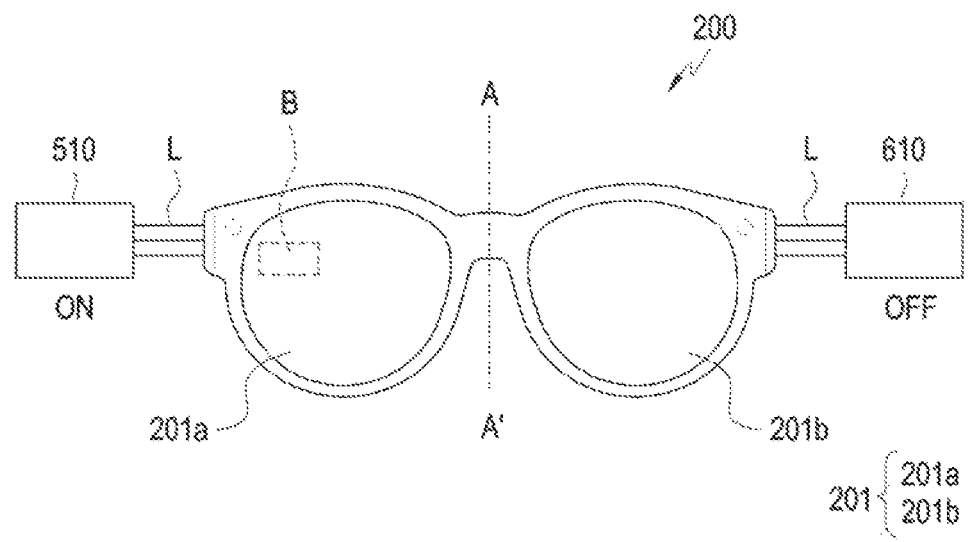
FIG. 9 is a view illustrating a state in which an image is output to a first display member of an electronic device according to an embodiment of the disclosure.

FIG. 9 is a view illustrating a state in which an image is output on the first display member 201a of the wearable electronic device 200 according to an embodiment of the disclosure.

Referring to FIGS. 8 and 9 together, various electronic components adjacent to the first display member 201a of the wearable electronic device 200 may be connected to the first circuit board 510 and various electronic components adjacent to the second display member 201b may be connected to the second circuit board 610. The connection between the electronic components and the circuit boards may be implemented by a plurality of lines L (e.g., signal lines or power lines).

According to various embodiments, the screen displayed on the first display member 201a and the screen displayed on the second display member 201b may be simultaneously implemented through synchronization between the first operating system (e.g., the first operating system 501 in FIG. 6) and the second operating system (e.g., the second operating system 601 in FIG. 6). According to an embodiment, the first operating system and the second operating system may be synchronized using a board-to-board (BTB) connector.

According to various embodiments, the first operating system (e.g., the first operating system 501 in FIG. 6) and/or the second operating system (e.g., the second operating system 601 in FIG. 6) may adjust output during operation of the first display member 210a and/or the second display member 201b based on a battery residual capacity of the wearable electronic device 200.

According to an embodiment, as illustrated in FIG. 8, the first operating system 501 and the second operating system 601 may output screens in which AR objects B and C (e.g., event information) are added the images or videos of the first display member 201a and the second display member 201b, respectively.

In contrast, according to the embodiment illustrated in FIG. 9, any one of the first operating system 501 and the second operating system 601 (e.g., the first operating system 501) may provide event information B to a display member (e.g., the first display member 201a), and the other (e.g., the second operating system 601) may stop providing event information C implemented on a display member (e.g., the second display member 201b). The first operating system 501 and the second operating system 601 may independently display an AR object based on the state (e.g., power state) of the wearable electronic device 200. A method of outputting a screen to which an AR object is added through the first operating system 501 and the second operating system 601 may vary according to embodiments. According to an embodiment, when a specific event occurs, the operation of changing the display of an AR object output via the first operating system 501 and the display of an AR object output via the second operating system 601 is also possible.

The wearable electronic device 200 according to an embodiment of the disclosure has an advantage in that it is possible to operate a binocular display type wearable electronic device 200 with a smaller number of signal lines (e.g., connectors). According to various embodiments of the disclosure, in a binocular display type wearable device, the operating system is divided into dual systems, thereby reducing the number of signal lines provided between the left and right eyes. When the electronic components provided on the first circuit board 510 are used, the first operating system 501 capable of operating the first display member 201a may be configured, and when the corresponding electronic components provided on the second circuit board 610 are used, the second operating system 601 capable of operating the second display member 201b may be configured. Signals may be transmitted mutually between the first operating system 501 and the second operating system 601 using a communication connector, and synchronization of the first display member 201a and the second display member 201b may be implemented.

According to various embodiments of the disclosure, it is possible to provide a wearable electronic device (e.g., the wearable electronic device 200 in FIG. 2) including: a first display member (e.g., the first display member 201a in FIG. 2) and a second display member (e.g., the second display member 201b in FIG. 2) provided to correspond to both eyes of a user in order to provide visual information to the user; a lens frame (e.g., the lens frame 202 in FIG. 2) surrounding at least a part of the first display member and the second display member; a first wearing member (e.g., the first wearing member 203a in FIG. 3) coupled to one portion of the lens frame; a second wearing member (e.g., the second wearing member 203b in FIG. 3) coupled to the other portion of the lens frame; a first circuit board (e.g., the first circuit board 510 in FIG. 6) disposed inside the first wearing member, where a first processor (e.g., the first processor 511 in FIG. 6) configured to operate the first display member is mounted on the first circuit board; and a second circuit board (e.g., the second circuit board 610 in FIG. 6) disposed inside the second wearing member, where a second processor (e.g., the second processor 611 in FIG. 6) configured to operate the second display member is mounted on the second circuit board, where the first processor and the second processor independently operate to output lights for the first display member and for the second display member, respectively.

According to various embodiments, the first processor and the second processor are capable of synchronizing a screen displayed on the first display member and a screen displayed on the second display member.

According to various embodiments, the screen displayed on the first display member and the screen displayed on the second display member may be synchronized by connecting the first circuit board and the second circuit board to each other using a connector.

According to various embodiments, the lens frame may include a connection member between the first display member and the second display member, and the connector may be disposed to penetrate the connection member.

According to various embodiments, hinge members may be provided between each of the first wearing member and the lens frame, and between the second wearing member and the lens frame, respectively and connectors may be disposed to penetrate the hinge members.

According to various embodiments, each of the first circuit board and the second circuit board may be communicatively connected to an external electronic device or a server using a short-range communication module provided therein.

According to various embodiments, the wearable electronic device may further include a plurality of camera modules.

According to various embodiments, the plurality of camera modules may include a first camera module (e.g., the first camera module 530 in FIG. 6) and a second camera module (e.g., the second camera module 540 in FIG. 6), which are disposed on a portion corresponding to the first display member, and a third camera module (e.g., the third camera module 630 in FIG. 6) and a fourth camera module (e.g., the fourth camera module 640 in FIG. 6), which are disposed on a portion corresponding to the second display member.

According to various embodiments, the first camera module and the third camera module may be connected to the first circuit board using a connector and controlled by the first processor, and the second camera module and the fourth camera module may be connected to the second circuit board using a connector, and may be controlled by the second processor.

According to various embodiments, the first processor and the second processor are capable of transmitting or receiving camera-related information processed by the first processor and camera-related information processed by the second processor in both directions via at least one connector.

According to various embodiments, the first processor or the second processor may be configured to adjust an output of the first display member or the second display member based on a battery residual capacity of the wearable electronic device when the first display member or the second display member is operated.

According to various embodiments of the disclosure, it is possible to provide a wearable electronic device (e.g., the wearable electronic device 200 of FIG. 2) with a dual system, the wearable electronic device including: a first display member (e.g., the first display member 201a in FIG. 2) and a second display member (e.g., the second display member 201b in FIG. 2) provided to correspond to both eyes of a user in order to provide visual information to the user; a lens frame (e.g., the lens frame 202 in FIG. 2) surrounding at least a part of the first display member and the second display member and defining an internal space of the electronic device; wearing members (e.g., the wearing members 203 in FIG. 3) coupled to one portion and the other portion of the lens frame, respectively; a first operating system (e.g., the first operating system 501 of FIG. 6) including a first processor (e.g., the first processor 511 in FIG. 6) and configured to control the first display member; a second operating system (e.g., the second operating system 601 in FIG. 6) including a second processor (e.g., the second processor 611 in FIG. 6) and configured to control the second display member; and a connector for display synchronization and data transmission of the first operating system and the second operating system.

According to various embodiments, a screen displayed on the first display member and a screen displayed on the second display member may be displayed in synchronization between the first operating system and the second operating system.

According to various embodiments, the connector may be a board-to-board (BTB) connector.

According to various embodiments, the lens frame may include a connection member between the first display member and the second display member, and the connector may be disposed to penetrate the connection member.

According to various embodiments, hinge members may be provided between the first wearing member and the lens frame, and between the second wearing member and the lens frame, and connectors may be disposed to penetrate the hinge members.

According to various embodiments, the first operating system and the second operating system may be communicatively connected to an external electronic device or a server using a short-range communication module provided therein.

According to various embodiments, a dual system including a plurality of camera modules may be included.

According to various embodiments, the plurality of camera modules may include a first camera module and a second camera module, which are disposed on a portion corresponding to the first display member, and a third camera module and a fourth camera module, which are disposed on a portion corresponding to the second display.

According to various embodiments, it is possible to provide a wearable electronic device including a dual system, where the first camera module and the third camera module are connected to the first operating system and may be controlled by the first operating system, and the second camera module and the fourth camera module are connected to the second operating system and may be controlled by the second operating system.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

It may be apparent to a person ordinarily skilled in the technical field to which the disclosure belongs that the above-mentioned electronic device according to various embodiments is not limited by the above-mentioned embodiment and drawings, and may be variously substituted, modified, and changed within the technical scope of the disclosure.

The invention claimed is:

1. A wearable electronic device comprising:
a first display member corresponding to a first eye of a user,
a second display member corresponding to a second eye of the user, the first display member and the second display member being configured to provide visual information to the user;
a lens frame surrounding at least a part of the first display member and at least a part of the second display member;
a first wearing member provided on a first portion of the lens frame;
a second wearing member provided on a second portion of the lens frame;
a first circuit board provided in the first wearing member;
a first processor provided on the first circuit board and configured to operate the first display member;
a second circuit board provided in the second wearing member; and
a second processor provided on the second circuit board and configured to operate the second display member,
wherein the first processor and the second processor are configured to operate independently such that the first processor is configured to output lights for the first display member and the second processor is configured to output lights for the second display member, and
wherein the first processor and the second processor are configured to synchronize a first screen displayed on the first display member and a second screen displayed on the second display member by connecting the first circuit board and the second circuit board with a first connector.

2. The wearable electronic device of claim 1, wherein the lens frame comprises a connection member between the first display member and the second display member, and the first connector penetrates the connection member.

3. The wearable electronic device of claim 1, wherein a first hinge member is provided between the first wearing member and the lens frame, and a second hinge member is provided between the second wearing member and the lens frame, and
wherein a second connector penetrates the first hinge member, and a third connector penetrates the second hinge member.

4. The wearable electronic device of claim 1, wherein each of the first circuit board and the second circuit board is configured to be connected to an external electronic device or a server by a short-range communication module.

5. The wearable electronic device of claim 1, further comprising a plurality of camera modules.

6. The wearable electronic device of claim 5, wherein the plurality of camera modules comprise:
a first camera module and a second camera module which are provided on a portion of the first display member, and
a third camera module and a fourth camera module which are provided on a portion of the second display member.

7. The wearable electronic device of claim 6, wherein the first camera module and the third camera module are connected to the first circuit board and are configured to be controlled by the first processor, and
wherein the second camera module and the fourth camera module are connected to the second circuit board and are configured to be controlled by the second processor.

8. The wearable electronic device of claim 7, wherein the first processor is configured to transmit or receive camera-related information processed by the first processor and camera-related information processed by the second processor via at least one connector, and
wherein the second processor is configured to transmit or receive camera-related information processed by the first processor and camera-related information processed by the second processor via at least one connector.

9. The wearable electronic device of claim 1, wherein the first processor is configured to adjust an output of the first display member based on a battery residual capacity of the wearable electronic device when the first display member is operated, or the second processor is configured to adjust an output of the second display member based on the battery residual capacity of the wearable electronic device when the second display member is operated.

10. A wearable electronic device including a dual system, the wearable electronic device comprising:
  a first display member corresponding to a first eye of a user,
  a second display member corresponding to a second eye of the user, the first display member and the second display member being configured to provide visual information to the user;
  a lens frame surrounding at least a part of the first display member and at least a part of the second display member, and defining an internal space of the wearable electronic device;
  a first wearing member provided on a first portion of the lens frame;
  a second wearing member provided on a second portion of the lens frame;
  a first operating system comprising a first processor and configured to control the first display member;
  a second operating system comprising a second processor and configured to control the second display member; and
  a connector provided between the first processor and the second processor and configured for display synchronization and data transmission of the first operating system and the second operating system,
  wherein the first processor and the second processor are configured to synchronize a first screen displayed on the first display member and a second screen displayed on the second display member by the connector.

11. The wearable electronic device of claim 10, wherein a screen displayed on the first display member and a screen displayed on the second display member are displayed in synchronization.

12. The wearable electronic device of claim 10, wherein the connector comprises a board-to-board (BTB) connector.

13. The wearable electronic device of claim 10, wherein the lens frame comprises a connection member between the first display member and the second display member, and the connector is configured to penetrate the connection member.

14. The wearable electronic device of claim 10, wherein a first hinge member is provided between the first wearing member and the lens frame, and a second hinge member is provided between the second wearing member and the lens frame, and
  wherein a second connector penetrates the first hinge member, and a third connector penetrates the second hinge member.

15. The wearable electronic device of claim 10, wherein the first operating system and the second operating system are configured to be connected to an external electronic device or a server by a short-range communication module.

16. The wearable electronic device of claim 10, further comprising a plurality of camera modules.

17. The wearable electronic device of claim 16, wherein the plurality of camera modules comprise:
  a first camera module and a second camera module provided on a portion of to the first display member, and
  a third camera module and a fourth camera module provided on a portion of the second display member.

18. The wearable electronic device of claim 17, wherein the first camera module and the third camera module are connected to the first operating system and are configured to be controlled by the first operating system, and
  the second camera module and the fourth camera module are connected to the second operating system and are configured to be controlled by the second operating system.

* * * * *